US009793774B2

United States Patent
Yokota et al.

(10) Patent No.: US 9,793,774 B2
(45) Date of Patent: Oct. 17, 2017

(54) ARMATURE FOR ROTARY ELECTRIC MACHINE

(71) Applicants: Hirohisa Yokota, Tokyo (JP); Yutaro Shirai, Tokyo (JP); Shinichiro Yoshida, Tokyo (JP)

(72) Inventors: Hirohisa Yokota, Tokyo (JP); Yutaro Shirai, Tokyo (JP); Shinichiro Yoshida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 266 days.

(21) Appl. No.: 14/421,484

(22) PCT Filed: Oct. 16, 2012

(86) PCT No.: PCT/JP2012/076716
§ 371 (c)(1),
(2) Date: Feb. 13, 2015

(87) PCT Pub. No.: WO2014/061101
PCT Pub. Date: Apr. 24, 2014

(65) Prior Publication Data
US 2015/0188372 A1 Jul. 2, 2015

(51) Int. Cl.
*H02K 3/12* (2006.01)
*H02K 3/34* (2006.01)
(Continued)

(52) U.S. Cl.
CPC ............... *H02K 3/12* (2013.01); *H02K 3/18* (2013.01); *H02K 3/30* (2013.01); *H02K 3/34* (2013.01);
(Continued)

(58) Field of Classification Search
CPC ..... H02K 3/18; H02K 3/522; H02K 3/34; H02K 2203/12; H02K 3/345
(Continued)

(56) References Cited

U.S. PATENT DOCUMENTS

2010/0000624 A1    1/2010  Matsushita et al.
2010/0026133 A1*   2/2010  Fubuki ............... H02K 3/18
                                                    310/208

FOREIGN PATENT DOCUMENTS

CN    101689780 A    3/2010
CN    102195381 A    9/2011
(Continued)

OTHER PUBLICATIONS

Communication dated Sep. 5, 2016 from the State Intellectual Property Office of the P.R.C. in counterpart application No. 201280076418.X.
(Continued)

*Primary Examiner* — Naishadh Desai
(74) *Attorney, Agent, or Firm* — Sughrue Mion, PLLC; Richard C. Turner

(57) ABSTRACT

An armature for a rotary electric machine includes: a core that includes a plurality of teeth that are arranged at a predetermined pitch in a circumferential direction; and a plurality of edgewise coils that are configured by winding a rectangular conductor wire into an edgewise winding, the plurality of edgewise coils each include rectilinear portions and coil end portions that are arranged radially, and that are each linked by bent portions, the rectilinear portions are arranged radially on circumferential side portions of the teeth so as to be gradually further away from a central axis of the teeth from a tip end of the teeth toward a root, and radially adjacent portions of the rectangular conductor wire are configured such that bulging portions that arise due to
(Continued)

compressive stresses resulting from bending at inner peripheral side portions of the bent portions do not face each other.

7 Claims, 6 Drawing Sheets

(51) Int. Cl.
    *H02K 3/18*     (2006.01)
    *H02K 3/52*     (2006.01)
    *H02K 3/30*     (2006.01)
    *H02K 3/38*     (2006.01)

(52) U.S. Cl.
    CPC ............... *H02K 3/38* (2013.01); *H02K 3/522* (2013.01); *H02K 2203/12* (2013.01)

(58) Field of Classification Search
    USPC ........................................ 310/194, 214, 215
    See application file for complete search history.

(56) References Cited

FOREIGN PATENT DOCUMENTS

| | | |
|---|---|---|
| JP | 2005-304244 A | 10/2005 |
| JP | 2008-228435 A | 9/2008 |
| JP | 2010-045868 A | 2/2010 |
| JP | 2010-268586 A | 11/2010 |
| JP | 4583798 B2 | 11/2010 |

OTHER PUBLICATIONS

International Search Report of PCT/JP2012/076716 dated Jan. 22, 2013 [PCT/ISA/210].

\* cited by examiner

ARMATURE FOR ROTARY ELECTRIC MACHINE

CROSS REFERENCE TO RELATED APPLICATIONS

This application is a National Stage of International Application No. PCT/JP2012/076716, filed Oct. 16, 2012, the contents of which are incorporated herein by reference in its entirety.

TECHNICAL FIELD

The present invention relates to an armature for a rotary electric machine that includes an edgewise coil that is produced by winding a rectangular conductor wire into an edgewise winding.

BACKGROUND ART

Because rectangular conductor wire is used instead of round wire, edgewise coils that are produced by winding into edgewise windings have advantages such as improving space factor, and lowering resistance values. In addition, because they are not wound into multiple layers, edgewise coils also have advantages such as reducing internal and external differences in coil temperature, and having good heat radiating characteristics.

However, when a rectangular conductor wire is wound into an edgewise winding, outer peripheral portions are stretched, and compressive stresses act on inner peripheral portions. The inner peripheral portions have a tendency to bulge due to the action of the compressive stresses. An insulating coating such as enamel is generally coated onto the surface of the rectangular conductor wire.

In conventional edgewise coil constructions, in which bending is applied at identical positions so as to be arranged neatly, the inner peripheral bulging portions due to bending overlap in a direction of lamination of the coils, and there has been a risk that insulation between the wire of the coils may deteriorate.

In consideration of such conditions, rotary electric machines have been proposed that include: a first bent portion to which bending is applied, and that constitutes a coil end portion; and a second bent portion that is disposed adjacent to the first bent portion in the direction of lamination of the coils, and that constitutes a coil end portion, in which deterioration in insulation between wires of a coil is suppressed by disposing inner peripheral portions of the first bent portion and the second bent portion such that positions thereof are offset from each other in a flat face direction of the rectangular conductor wire only in the coil end portion, and also by preventing portions of the rectangular conductor wire in which bulging portions that arise due to compressive stresses due to bending are adjacent from facing each other in inner peripheral portions (see Patent Literature 1, for example).

CITATION LIST

Patent Literature

Patent Literature 1: Japanese Patent No. 4583798 (Gazette)

SUMMARY OF THE INVENTION

Problem to be Solved by the Invention

In the rotary electric machines that is described in Patent Literature 1, because the inner peripheral portions of the first bent portion and the second bent portion are disposed such that positions thereof are offset from each other in the flat face direction of the rectangular conductor wire, i.e., in the axial direction of the rotary electric machine such that adjacent bulging portions of the rectangular conductor wire that arise due to compressive stresses due to bending do not face each other, one problem has been that axial dimensions of the rotary electric machine are increased by an amount proportionate to the axial offsetting of the adjacent coil end portions.

The present invention aims to solve the above problems and an object of the present invention is to provide an armature for a rotary electric machine that can suppress overlap between inner peripheral portions of bent portions, enable reductions in axial size, and increase insulation between wires of an edgewise coil, without increasing longitudinal dimensions of the rectilinear portions of the edgewise coil.

Means for Solving the Problem

In order to achieve the above object, according to one aspect of the present invention, there is provided an armature for a rotary electric machine including: a core that includes a plurality of teeth that are respectively arranged so as to extend radially at a predetermined pitch in a circumferential direction; and a plurality of edgewise coils that are configured by winding a rectangular conductor wire that is coated with insulation for a plurality of turns into an edgewise winding. The plurality of edgewise coils each include rectilinear portions and coil end portions that are arranged radially, and that are each linked by bent portions. The rectilinear portions are arranged radially on circumferential side portions of the teeth so as to be gradually further away from a central axis of the teeth from a tip end of the teeth toward a root, and radially adjacent portions of the rectangular conductor wire are configured such that bulging portions that arise due to compressive stresses resulting from bending at inner peripheral side portions of the bent portions do not face each other.

Effects of the Invention

According to the present invention, the rectilinear portions are arranged radially on circumferential side portions of the teeth so as to be gradually further away from a center line of the teeth from a tip end of the teeth toward a root, and radially adjacent portions of the rectangular conductor wire are configured such that bulging portions that arise due to compressive stresses resulting from bending at inner peripheral side portions of the bent portions do not face each other. Thus, deterioration in insulation between coils of the edgewise coil can be suppressed without increasing axial dimensions of the armature.

DESCRIPTION OF EMBODIMENTS

Preferred embodiments of an armature for a rotary electric machine according to the present invention will now be explained using the drawings.

Embodiment 1

Figure 1:
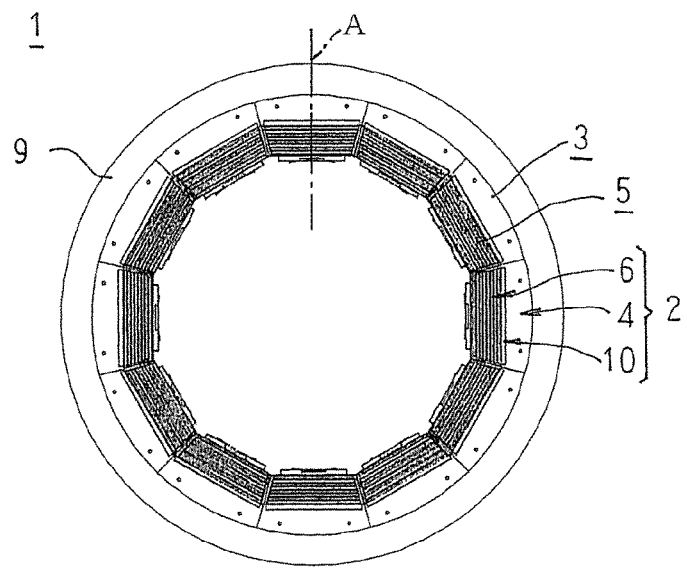
FIG. 1 is an end elevation that shows a stator of a rotary electric machine according to Embodiment 1 of the present invention.
Figure 2:
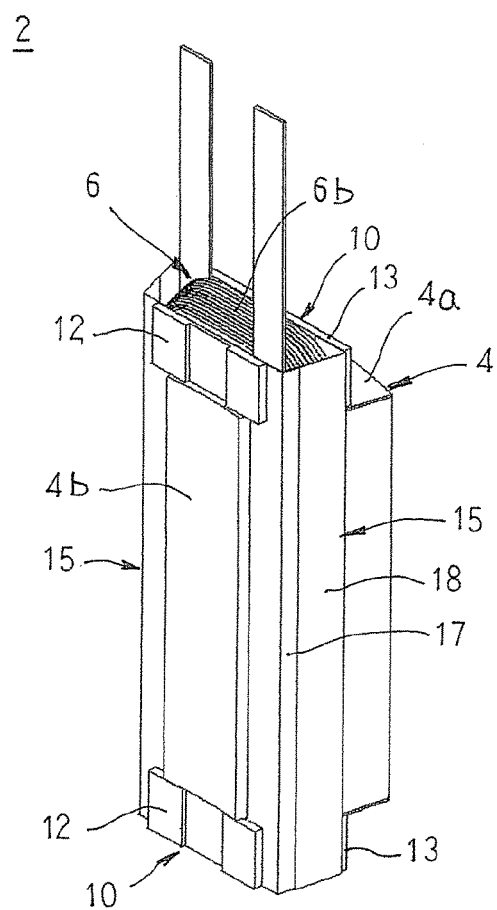
FIG. 2 is an oblique projection that shows a core unit that constitutes the stator of the rotary electric machine according to Embodiment 1 of the present invention.
Figure 3:
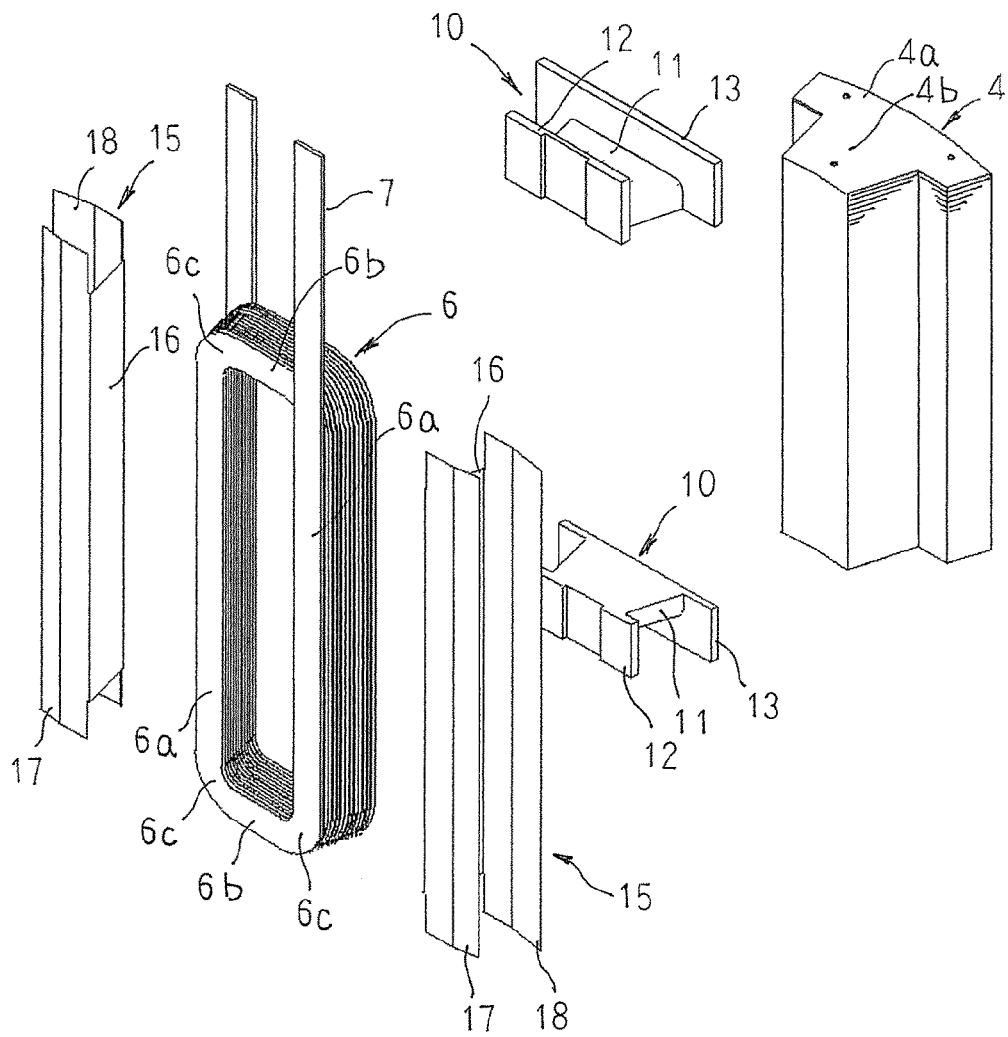
FIG. 3 is an exploded oblique projection that shows the core unit that constitutes the stator of the rotary electric machine according to Embodiment 1 of the present invention.
Figure 4:
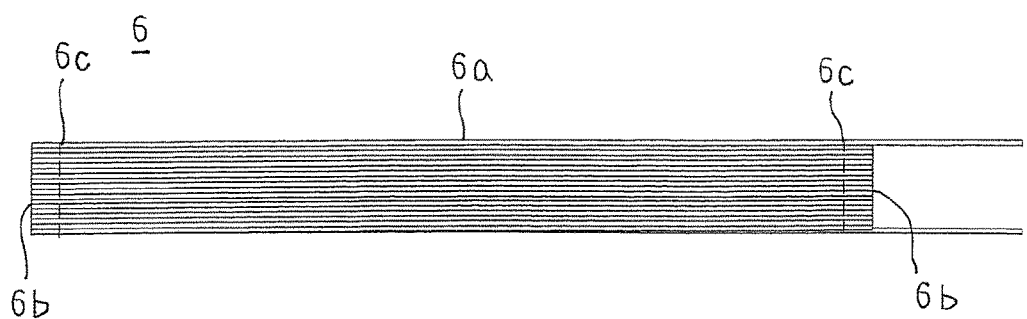
FIG. 4 is a side elevation that shows a concentrated winding coil that is used in the core unit that constitutes the stator of the rotary electric machine according to Embodiment 1 of the present invention.
Figure 5:
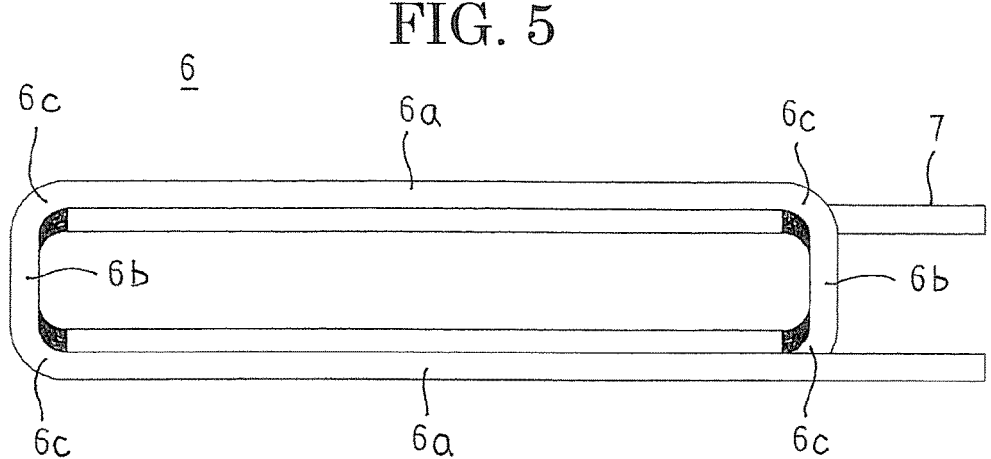
FIG. 5 is a rear elevation that shows the concentrated winding coil that is used in the core unit that constitutes the stator of the rotary electric machine according to Embodiment 1 of the present invention.
Figure 6:
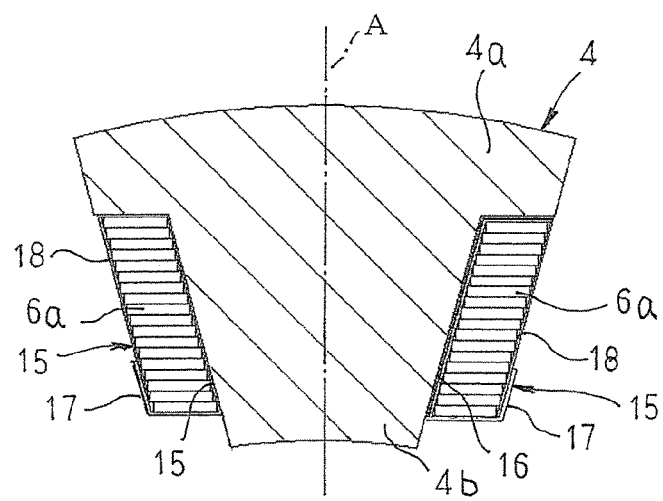
FIG. 6 is a cross section that shows a vicinity of a tooth in the core unit that constitutes the stator of the rotary electric machine according to Embodiment 1 of the present invention.
Figure 7:
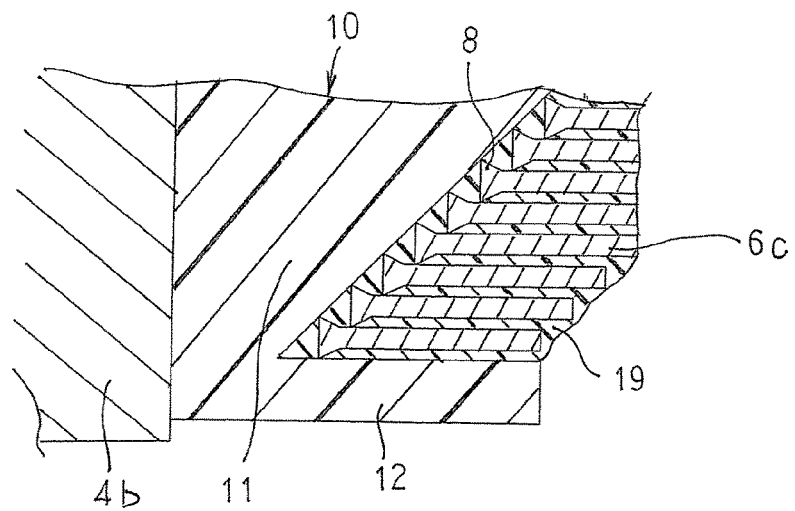
FIG. 7 is a cross section that shows a vicinity of bent portions in the core unit that constitutes the stator of the rotary electric machine according to Embodiment 1 of the present invention.

FIG. 1 is an end elevation that shows a stator of a rotary electric machine according to Embodiment 1 of the present invention, FIG. 2 is an oblique projection that shows a core unit that constitutes the stator of the rotary electric machine according to Embodiment 1 of the present invention, FIG. 3 is an exploded oblique projection that shows the core unit that constitutes the stator of the rotary electric machine according to Embodiment 1 of the present invention, FIG. 4 is a side elevation that shows a concentrated winding coil that is used in the core unit that constitutes the stator of the rotary electric machine according to Embodiment 1 of the present invention, FIG. 5 is a rear elevation that shows the concentrated winding coil that is used in the core unit that constitutes the stator of the rotary electric machine according to Embodiment 1 of the present invention, FIG. 6 is a cross section that shows a vicinity of a tooth in the core unit that constitutes the stator of the rotary electric machine according to Embodiment 1 of the present invention, and FIG. 7 is a cross section that shows a vicinity of bent portions in the core unit that constitutes the stator of the rotary electric machine according to Embodiment 1 of the present invention.

In FIG. 1, a stator 1 that functions as an armature includes: an annular stator core 3; and a stator coil 5 that is mounted onto the stator core 3. The stator core 3 is divided into twelve equal sections in a circumferential direction so as to be constituted by twelve core blocks 4. The stator coil 5 is constituted by twelve concentrated winding coils 6. The stator 1 is configured by configuring core units 2 by mounting the concentrated winding coils 6 onto the core blocks 4, arranging the core units 2 annularly in a circumferential direction, and inserting them into and fixing them to an annular frame 9.

Here, as shown in FIG. 3, the core units 2 include: a core block 4; a concentrated winding coil 6; a pair of bobbins 10; and a pair of insulating sheets 15.

The core blocks 4 are produced by laminating and integrating a large number of electromagnetic steel plates that have been punched into identical shapes, for example, and have: a circular arc-shaped core back portion 4a; and a tooth 4b that is disposed so as to extend radially inward from a circumferential center of an inner circumferential surface of the core back portion 4a. The tooth 4b is a prism that has a shape in which a circumferential width widens gradually from a tip end of the tooth 4b toward a root, and in which an end surface (a bottom surface) has an approximately trapezoidal shape. Here, an axis that passes through a center of the tooth 4b in a width direction and a central axis of the stator core 3 will be designated a central axis A of the tooth 4b.

As shown in FIGS. 4 and 5, the concentrated winding coils 6 are edgewise coils that are produced by winding a rectangular conductor wire 7 into an edgewise winding in a single layer for a predetermined number of turns. Copper wire or aluminum wire, etc., that is coated with insulation is used as the rectangular conductor wire 7. Each of the turns of the concentrated winding coil 6 is formed into a racetrack shape in which a pair of facing parallel rectilinear portions 6a and a pair of facing parallel coil end portions 6b are linked by bent portions 6c that are bent so as to have a predetermined curvature. The concentrated winding coils 6 are configured by linking the rectilinear portions 6a and the coil end portions 6b helically using the bent portions 6c so as to be laminated for a predetermined number of turns in a direction that is perpendicular to plane that is constituted by a long side of a rectangular cross section of the rectangular conductor wire 7 (hereinafter called "the direction of coil lamination").

The rectilinear portions 6a, which are arranged in two columns, each have a length that is equal to an axial length of the tooth 4b, the facing rectilinear portions 6a are arranged such that the spacing therebetween widens gradually in a first direction of the direction of coil lamination so as to be able to be fitted onto the tooth 4b, which is a prism that has a bottom surface that is an approximately trapezoidal shape. The coil end portions 6b, which are arranged in two columns, are arranged in the direction of coil lamination such that the spacing between facing coil end portions 6b is constant. Overlap in a vicinity of inner peripheral edges of bent portions 6c that are adjacent to each other in the direction of coil lamination can thereby be avoided.

Now, stretching occurs at the outer peripheral portions of the bent portions 6c, which are bent so as to have a predetermined curvature. At the same time, as shown in the figures, compressive stresses act at the inner peripheral portions of the bent portions 6c due to the bending, giving rise to bulging portions 8. Thus, irregularities in the thickness of the insulating coating are more likely to occur due to the bulges, i.e., deformation, at the inner peripheral portions of the bent portions 6c.

The bobbins 10, which function as insulating end plates, are resin-molded bodies in which a polyphenylene sulfide (PPS) resin is used, for example. The bobbins 10 have: trunk portions 11 in which a cross section parallel to a longitudinal direction is a trapezoidal shape, in which a cross section that is perpendicular to the longitudinal direction is an approximately rectangular shape in which rounding is applied to two corner portions on an upper portion side, and that are disposed such that the longitudinal directions are oriented in a direction of projection of the tooth 4b (a radial direction) and bottom surfaces contact two axial end surfaces of the tooth 4b; first guiding portions 12 that extend away from the bottom surfaces (away from the tooth 4b) from a first longitudinal end of upper surfaces of the trunk portions 11; and second guiding portions 13 that extend away from the bottom surfaces from a second longitudinal end of the upper surfaces of the trunk portions 11 so as to face the first guiding portions 12. Moreover, the bottom surfaces of the trunk portions 11 are formed so as to have shapes that are approximately identical to the end surfaces of the tooth 4b except that heights of the trapezoidal shapes are lower, and two corner portions near upper portions of the trunk portions 11 are formed so as to have a curvature that is equal to the curvature of the inner circumferential side surfaces of the bent portions 6c of the concentrated winding coil 6.

The insulating sheets 15 are formed by press-molding a sheet that is formed by sandwiching a polyimide film between meta-aramid fibers, for example. The insulating sheets 15 have: a slot insulating portion 16 that is placed on inner wall surfaces of the core back portions 4a and the tooth 4b of the core block 11, which define slots; and first and second interphase insulating portions 17 and 18 that are folded over to cover the columns of rectilinear portions 6a of the concentrated winding coil 6.

Next, to assemble the core units 2, the pair of bobbins 10 are inserted into an inner peripheral side of the concentrated winding coil 6, and moved in the longitudinal direction of the rectilinear portions 6a so as to be mounted to the concentrated winding coil 6. Thus, the columns of coil end portions 6b, which are arranged in the direction of coil lamination, are inserted between the first guiding portions 12 and the second guiding portions 13, and inner peripheral side surfaces of the coil end portions 6b and the bent portions 6c contact outer peripheral surfaces of the trunk portions 11. Next, the insulating sheets 15 are mounted so as to place the slot insulating portions 16 alongside inner peripheral side surfaces of each of the columns of rectilinear portions 6a that are laminated in the direction of coil lamination. Then, the interphase insulating portions 17 and 18 of the insulating sheets 15 are folded over to envelop the outer periphery of each of the columns of rectilinear portions 6a that are laminated in the direction of coil lamination. Next, the concentrated winding coil 6 to which the bobbins 10 and the insulating sheets 15 have been mounted is mounted over the tooth 4b of the core block 4 to assemble the core unit 2 that is shown in FIG. 3.

Next, twelve core units 2 are arranged annularly in a circumferential direction such that circumferential side surfaces of the core back portions 4a of the core blocks 4 are butted against each other. Then, the core units 2 that are arranged annularly in the circumferential direction are press-fitted into and fixed to the annular frame 9, or are inserted inside and fixed to the frame 9 by shrinkage fitting, to assemble the stator 1 that is shown in FIG. 1. Next, a varnish 19 is dripped onto the concentrated winding coils 6. Then, the varnish 19 is impregnated between the rectangular conductor wires 7 and between the rectangular conductor wires 7 and the insulating sheets 15 by capillary action, and is hardened. The twelve concentrated winding coils 6 are AC-connected to configure the stator coil 5.

Moreover, the core blocks 4 are arranged into an annular shape by butting circumferential side surfaces of the core back portions 4a against each other to configure the stator core 3. The core back portions 4a link circumferentially to configure the annular core back of the stator core 3, and spaces that are formed by the core back and adjacent teeth 4b constitute the slots. The coil end portions 6b and the bent portions 6c of the concentrated winding coils 6 that protrude axially outward from the stator core 3 constitute coil ends of the stator coil 5.

Although not shown, the stator 1 that is assembled in this manner is held by a housing so as to surround a rotor that is rotatably disposed inside the housing, to constitute a rotary electric machine such as an electric motor, or a generator, etc.

As shown in FIG. 6, the rectilinear portions 6a of the concentrated winding coils 6 are arranged so as to be gradually further away from a central axis A of the teeth 4b on two circumferential sides of the teeth 4b from the tip end of the teeth 4b toward the root. Thus, the rectilinear portions 6a are arranged so as to line up in single columns in the direction of coil lamination (the radial direction) in close proximity alongside two circumferential side surfaces of the teeth 4b, which have approximately trapezoidal cross-sectional shapes. The insulating sheets 15 are mounted such that the slot insulating portions 16 are interposed between the teeth 4b and core back portions 4a and the columns of rectilinear portions 6a that are arranged in single columns, and the interphase insulating portions 17 and 18 are folded over so as to surround the outer periphery of the columns of rectilinear portions 6a. In addition, although not shown, the varnish 19 is impregnated between the core blocks 4 and the insulating sheets 15, between the insulating sheets 15 and the rectilinear portions 6a, and between the rectilinear portions 6a, and is hardened.

The coil end portions 6b of the concentrated winding coils 6 are arranged so as to line up in single columns in a radial direction at two axial ends of the teeth 4b such that inner peripheral side surfaces thereof are flush. The bobbins 10 are disposed on two axial end surfaces of the teeth 4b so as to contact the inner peripheral side surfaces of the coil end portions 6b that are arranged so as to be flush, and the inner peripheral side surfaces of the bent portions 6c. In addition, as shown in FIG. 7, the varnish 19 is impregnated between the bent portions 6c, and between the bent portions 6c and the bobbins 10, as well as between the coil end portions 6b, and between the coil end portions 6b and the bobbins 10, and is hardened.

According to Embodiment 1, the respective columns of rectilinear portions 6a are arranged such that spacing between rectilinear portions 6a that face each other in the circumferential direction of the stator core 3 widens gradually radially outward (in a first direction in the direction of coil lamination). Thus, the bulging portions 8 on the inner peripheral portions of the radially adjacent bent portion 6c are offset circumferentially, avoiding overlap. The rectangular conductor wires 7 can thereby be wound in a state of close contact, enabling radial dimensions of the stator 1 to be reduced in size. In addition, deterioration in voltage tolerance between the coils that results from the bulging portions 8, i.e., the portions where irregularities in the thickness of the insulating coating are generated, overlapping in a radial direction is suppressed.

Because the respective columns of coil end portions 6b are arranged in the radial direction such that the spacing between coil end portions 6b that face each other in an axial direction of the stator core 3 is constant, there are no increases in longitudinal dimensions of the rectilinear portions 6a of the concentrated winding coils 6, enabling the axial dimensions of the stator 1 to be reduced in size.

Because the teeth 4b of the core blocks 4 are produced so as to have a trapezoidal cross sectional shape in which a circumferential width thereof widens gradually from a tip end of the tooth 4b toward a root, magnetic saturation is alleviated, and enabling core loss to be reduced.

The teeth 4b are formed so as to have a trapezoidal cross sectional shape that approximately matches the cross-sectional shape between the columns of the rectilinear portions 6a of the concentrated winding coils 6 that are arranged in two columns. Thus, the concentrated winding coils 6 can be mounted onto the teeth 4b of the core blocks 4 such that the rectilinear portions 6a that are arranged in the direction of coil lamination are in close proximity to the two circumferential side surfaces of the teeth 4b. Thus, heat transference between the rectilinear portions 6a and the teeth 4b is improved, enabling heat generated in the concentrated winding coils 6 to be radiated efficiently by means of the core blocks 4.

Because the bobbins 10 are disposed on two axial end surfaces of the teeth 4b so as to contact the inner peripheral side surfaces of the coil end portions 6b and the bent portions 6c of the concentrated winding coils 6, positioning of the concentrated winding coils 6 that are mounted onto the teeth 4b is facilitated.

Because the slot insulating portions 16 of the insulating sheets 15 are interposed between the rectilinear portions 6a and the core blocks 4, voltage tolerance between the concentrated winding coils 6 and the core blocks 4 is increased. Because the interphase insulating portions 17 and 18 of the insulating sheets 15 are disposed so as to envelop the outer periphery of the columns of rectilinear portions 6a, voltage tolerance between the concentrated winding coils 6 is increased.

Because the varnish 19 is impregnated into the concentrated winding coils 6 and hardened, the concentrated winding coils 6 are fixed to the core blocks 4 firmly. The heat generated in the concentrated winding coils 6 is also easily transferred to the core blocks 4, enabling excessive temperature increases in the concentrated winding coils 6 to be suppressed.

Because the coil end portions 6b that face each other in the axial direction are arranged such that spacing therebetween is constant, the inner peripheral side surfaces of the coil end portions 6b that are arranged radially are flush. Thus, the facing surface area of the radially adjacent coil end portions 6b is increased, increasing the surface area bonded by the varnish 19, and fixing the concentrated winding coils 6 firmly.

Embodiment 2

Figure 8:
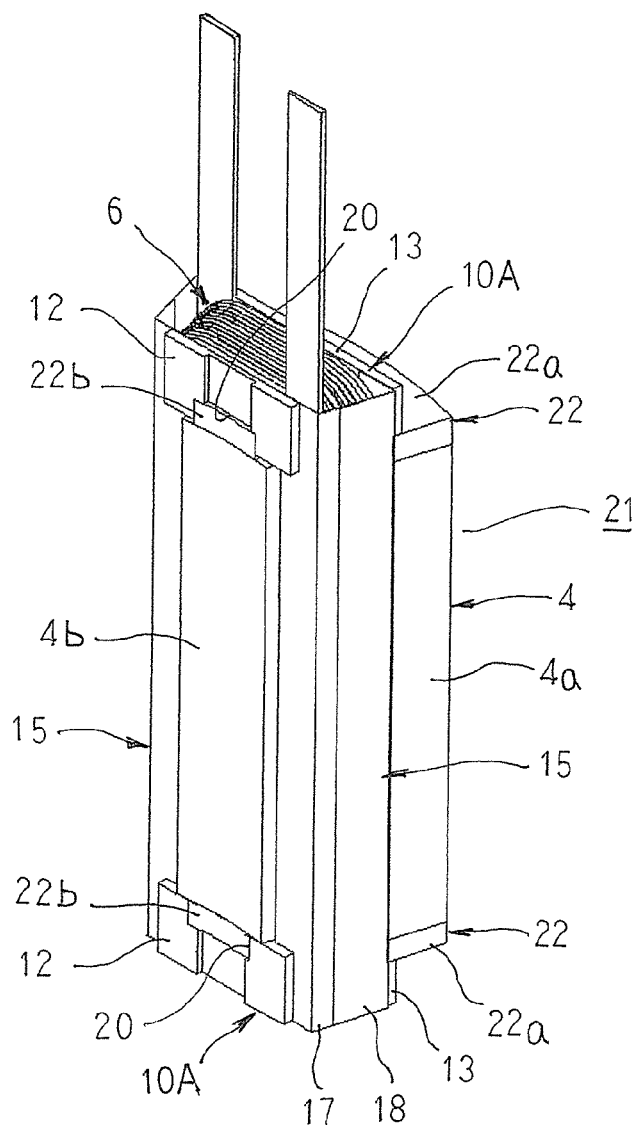
FIG. 8 is an oblique projection that shows a core unit that constitutes a stator of a rotary electric machine according to Embodiment 2 of the present invention.
Figure 9:
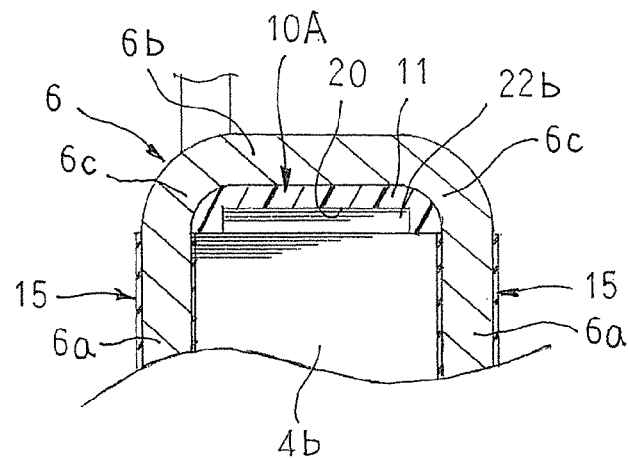
FIG. 9 is a partial cross section that shows the core unit that constitutes the stator of the rotary electric machine according to Embodiment 2 of the present invention.
Figure 10:
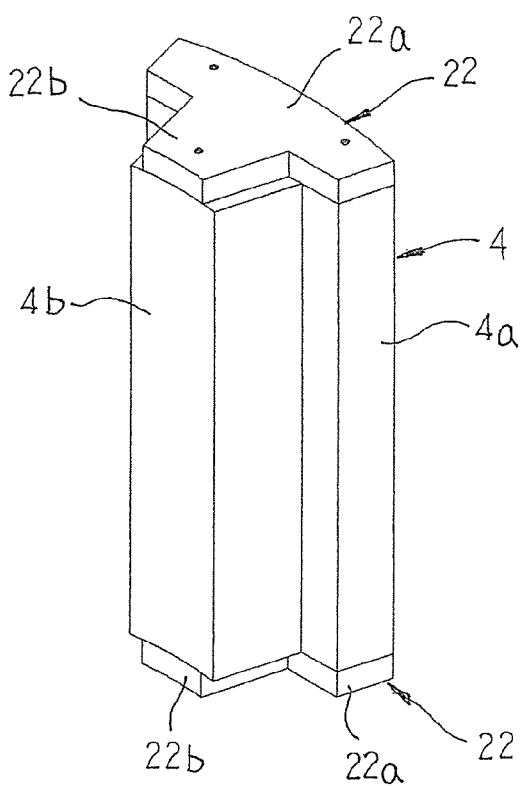
FIG. 10 is an oblique projection that shows a core block in the core unit that constitutes the stator of the rotary electric machine according to Embodiment 2 of the present invention.

FIG. 8 is an oblique projection that shows a core unit that constitutes a stator of a rotary electric machine according to Embodiment 2 of the present invention, FIG. 9 is a partial cross section that shows the core unit that constitutes the stator of the rotary electric machine according to Embodiment 2 of the present invention, and FIG. 10 is an oblique projection that shows a core block in the core unit that constitutes the stator of the rotary electric machine according to Embodiment 2 of the present invention.

In FIG. 8, a core unit 2A includes: a core block 21; a pair of bobbins 10A that are disposed on two axial ends of the core block 21; a concentrated winding coil 6; and a pair of insulating sheets 15. Although not shown, a varnish is also impregnated into the concentrated winding coil 6.

As shown in FIG. 9, a recessed groove 20 is recessed into a bottom surface of the bobbins 10A so as to extend from a first longitudinal end to a second longitudinal end at a constant groove depth such that a groove width widens gradually from the first longitudinal end toward the second longitudinal end. As shown in FIG. 10, the core block 21 is configured by fixing auxiliary cores 22 integrally to two axial end surfaces of the core block 4. The auxiliary cores have: a circular arc-shaped core back portion 22a; and a tooth 22b that is disposed so as to extend radially inward from a circumferential center of an inner circumferential surface of the core back portions 22a. The core back portion 22a is produced so as to have a circular arc shape that is identical to that of the core back portions 4a of the core block 4 at a thickness that is equal to the groove depth of the recessed groove 20. The tooth 22b is produced at a thickness that is equal to the groove depth of the recessed groove 20 into a prism that has a bottom surface that is a trapezoid in which a circumferential width widens gradually from the tip end of the tooth 22b toward a root, and is configured so as to be able to be housed in the recessed groove 20.

In the core unit 2A according to Embodiment 2, the auxiliary cores 22 are fixed integrally onto the two axial end surfaces of the core block 4, and the teeth 22b are housed inside the recessed grooves 20 of the bobbins 10A.

Moreover, Embodiment 2 is configured in a similar or identical manner to that of Embodiment 1 above except that the core unit 2A is used instead of the core unit 2.

According to Embodiment 2, because the auxiliary cores 22 are fixed integrally to the two axial end surfaces of the core block 4, the volume of the cores, which are magnetic material, is increased, reducing saturated magnetic flux density, and enabling core loss to be further reduced.

Embodiment 3

Figure 11:
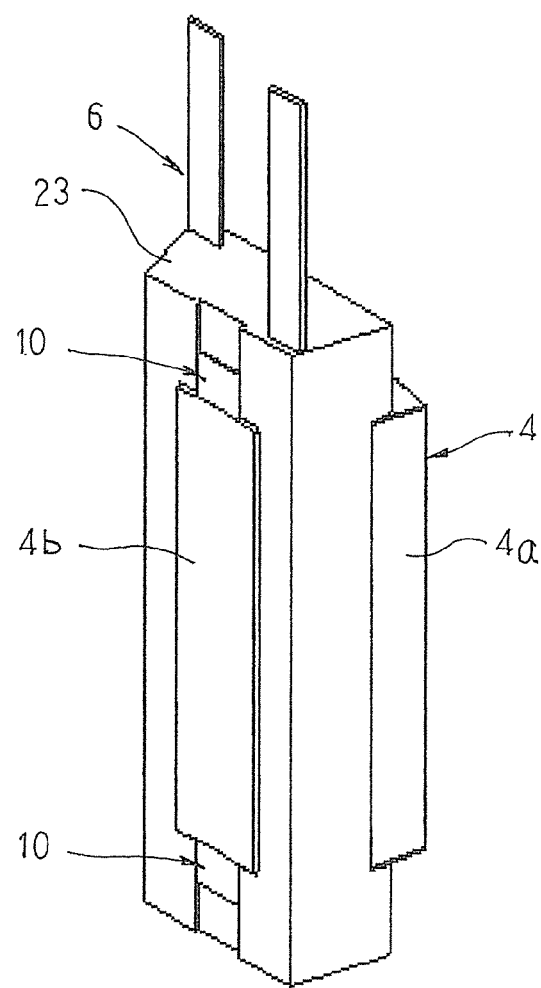
FIG. 11 is an oblique projection that shows a core unit that constitutes a stator of a rotary electric machine according to Embodiment 3 of the present invention.

FIG. 11 is an oblique projection that shows a core unit that constitutes a stator of a rotary electric machine according to Embodiment 3 of the present invention.

In FIG. 11, a core unit 2B is produced by mounting onto a core block 4 a concentrated winding coil 6 onto which a pair of bobbins 10 and a pair of insulating sheets 15 have been mounted, and then molding them integrally using an insulating resin such as an epoxy resin, etc.

Moreover, Embodiment 3 is configured in a similar or identical manner to that of Embodiment 1 above except that the core unit 2B is used instead of the core unit 2.

According to Embodiment 3, because the concentrated winding coil 6, the bobbins 10, and the insulating sheets 15 are integrated with the tooth 4b by a molded resin portion 23, handling of the core units 2B is facilitated, improving assembly of the stator. In addition, because the concentrated winding coil 6 is embedded in the molded resin portion 23, superior insulation is achieved.

Moreover, in each of the above embodiments, a stator core in which the number of slots is twelve is used, but the number of slots in the stator core is not limited to twelve.

In each of the above embodiments, the concentrated winding coils are mounted into a stator core in which slots have openings on a radially inner side, but similar or identical effects are also exhibited if the concentrated winding coils are mounted into a stator core in which slots have openings on a radially outer side.

In each of the above embodiments, the concentrated winding coils are mounted to a stator core, but the armature is not limited to a stator, and may be a rotor. In other words, similar or identical effects are also exhibited if the concentrated winding coils are mounted to a rotor core.

Concentrated winding coils that are configured by winding a rectangular conductor wire for a plurality of turns into an edgewise winding on a single tooth have been explained, but the present invention is not limited to concentrated winding coils provided that the coils are edgewise coils. For example, the coils may be distributed winding coils that are configured by winding a rectangular conductor wire for a plurality of turns into an edgewise winding so as to span a plurality of teeth.

The invention claimed is:

1. An armature for a rotary electric machine comprising:
a core that includes teeth that are respectively arranged to extend radially at a predetermined pitch in a circumferential direction; and
edgewise coils that are configured by winding a rectangular conductor wire that is coated with insulation for a plurality of turns into an edgewise winding,
wherein:
each of the edgewise coils includes rectilinear portions and coil end portions that are arranged radially, each of the rectilinear portions and the coil end portions being linked by bent portions;
the rectilinear portions are arranged radially on circumferential side portions of the teeth to be gradually further away from a central axis of a respective one of the teeth from a tip end of the respective one of the teeth toward a root of the respective one of the teeth; and
radially adjacent portions of the rectangular conductor wire are configured such that bulging portions that arise due to compressive stresses resulting from bending at inner peripheral side portions of the bent portions do not face each other.

2. The armature for a rotary electric machine according to claim 1, wherein each of the teeth have a trapezoidal cross sectional shape perpendicular to an axial direction in which a circumferential width widens gradually from the tip end of the respective one of the teeth toward the root of the respective one of the teeth, the rectilinear portions being arranged radially alongside circumferential side surfaces of the teeth.

3. The armature for a rotary electric machine according to claim 2, further comprising insulating end plates that are disposed on two axial end surfaces of each of the teeth, and that have an outer peripheral surface shape that contacts inner peripheral side surfaces of the coil end portions and the bent portions that are arranged radially.

4. The armature for a rotary electric machine according to claim 3, wherein recessed grooves that have a groove direction in a radial direction are recessed to extend from a first radial end to a second radial end of a bottom surface of the insulating end plates, and
the armature further comprises auxiliary cores that are disposed to protrude from two axial end surfaces of the core and to be housed inside the recessed grooves.

5. The armature for a rotary electric machine according to claim 2, further comprising insulating sheets that are disposed to surround an outer periphery of columns of the rectilinear portions that are arranged radially alongside the circumferential side surfaces of the teeth.

6. The armature for a rotary electric machine according to claim 5, further comprising a varnish that is impregnated into the edgewise coils.

7. The armature for a rotary electric machine according to claim 3, further comprising insulating sheets that are disposed to surround an outer periphery of columns of the rectilinear portions that are arranged radially alongside the circumferential side surfaces of the teeth,
wherein the edgewise coils are concentrated winding coils, and are molded integrally onto the teeth together with the insulating end plates and the insulating sheets, using an insulating resin.

\* \* \* \* \*